(12) United States Patent
Ikai et al.

(10) Patent No.: US 6,606,183 B2
(45) Date of Patent: Aug. 12, 2003

(54) METHOD FOR PRODUCING A CELL FOR AN ELECTROCHROMIC MIRROR AND AN ELECTROCHROMIC MIRROR

(75) Inventors: Keizo Ikai, Yokohama (JP); Tsuyoshi Asano, Yokohama (JP); Masaaki Kobayashi, Yokohama (JP); Yoshinori Nishikitani, Yokohama (JP)

(73) Assignees: Nippon Oil Corporation, Tokyo (JP); Kabushiki Kaisha Honda Lock, Miyazaki (JP)

( * ) Notice: Subject to any disclaimer, the term of this patent is extended or adjusted under 35 U.S.C. 154(b) by 0 days.

(21) Appl. No.: 09/745,788

(22) Filed: Dec. 22, 2000

(65) Prior Publication Data
US 2001/0006430 A1 Jul. 5, 2001

(30) Foreign Application Priority Data

Dec. 24, 1999 (JP) ............................................ 11-368490
Dec. 28, 1999 (JP) ............................................ 11-375558

(51) Int. Cl.$^7$ .............................. G02F 1/15; G02F 1/153
(52) U.S. Cl. ...................... 359/265; 359/270; 359/272; 359/273
(58) Field of Search ................................. 359/267, 268, 359/265, 270, 272, 273, 604, 296; 156/109, 145, 292, 293, 330; 556/423; 528/10, 27, 38; 445/25

(56) References Cited

U.S. PATENT DOCUMENTS

| | | | | |
|---|---|---|---|---|
| 4,761,061 A | * | 8/1988 | Nishiyama et al. | 359/265 |
| 4,902,108 A | | 2/1990 | Byker | 359/265 |
| 5,233,461 A | * | 8/1993 | Dornan et al. | 359/272 |
| 5,294,376 A | | 3/1994 | Byker | 252/600 |
| 6,023,364 A | * | 2/2000 | Kobayashi et al. | 359/265 |
| 6,203,154 B1 | * | 3/2001 | Kobayashi et al. | 359/270 |
| 6,302,986 B1 | * | 10/2001 | Toya et al. | 156/109 |
| 6,327,069 B1 | * | 12/2001 | Allemand et al. | 359/265 |
| 6,404,532 B1 | * | 6/2002 | Berneth et al. | 359/265 |
| 2001/0055143 A1 | * | 12/2001 | Ash et al. | 359/267 |
| 2002/0041443 A1 | * | 4/2002 | Varaprasad et al. | 359/603 |

FOREIGN PATENT DOCUMENTS

EP  0 612 826 A1  8/1994

* cited by examiner

Primary Examiner—Loha Ben
Assistant Examiner—William Choi
(74) Attorney, Agent, or Firm—Akin, Gump, Strauss, Hauer & Feld, L.L.P.

(57) ABSTRACT

A method for producing a cell for an electrochromic mirror which comprises a step of applying a epoxy-based sealant containing beads by a method selected from the group consisting of dispensing or screen-printing on a predetermined position of the surface peripheral edge of at least one of two electrically conductive substrates; and a step of superposing the two substrates such that the width of the applied sealant is made 2 mm or less.

20 Claims, No Drawings

METHOD FOR PRODUCING A CELL FOR AN ELECTROCHROMIC MIRROR AND AN ELECTROCHROMIC MIRROR

BACKGROUND OF THE INVENTION

1. Field of the Invention

This invention relates to a method for producing a cell for an electrochromic mirror which is capable of reversibly varying reflectance to electromagnetic radiation such as light.

2. Description of the Prior Art

Electrochromic mirrors have been used for glare-protection purposes from light emanating from the headlights of vehicles approaching from the rear by reversibly varying reflectance to electromagnetic radiation. Demand for such electrochromic mirrors has gone up sharply in recent years.

In general, an electrochromic mirror is formed by injecting an electrolyte and an electrochromic compound if necessary into a cell produced by sealing the periphery of a transparent electrically conductive substrate and a reflective electrically conductive superposed on each other.

An ability required for an electrochromic anti-glare mirror is glare-protection ability from light emanating from the headlights of vehicles approaching from the rear. In recent years, in addition to such an ability, there has arise a demand on an electrochromic mirror, such as being reduced in weight and enhanced in durability.

Since conventional electrochromic mirrors are comprised of two electrically conductive substrates laminated by applying on the periphery a sealant in large width, about 3 mm, the size of a mirror case used to conceal the sealed portion is large, resulting in the hindrance of the weight-reduction of an electrochromic mirror. One of the effective means to the weight-reduction of a mirror is to apply a sealant in such a narrower width that the mirror case can be decreased in size. However, a narrower sealant width deteriorates the ability of blocking the interior of an mirror from the surroundings, leading to deteriorated durability. In order to accomplish enhanced durability with a sealant applied in a narrower width, it is effective to apply a sealant uniformly and accurately.

Although various hardening resins such as epoxy resins have usually been used as a sealant, it has been found that conventional electrochromic anti-glare mirrors had malfunctioning in a sealant, i.e., sealing deficiency, caused by the foaming or bubbling and cracking of a sealant occurring when it is applied, which lead to the deterioration of the capabilities or performances of the mirror because the electrochromic part contained inside the mirrors is damaged, and that this was a factor that the durability was adversely affected.

SUMMARY OF THE INVENTION

An object of the present invention is to provide a method for producing a cell for an electrochromic mirror, which can reduce the weight thereof without deteriorating the durability of the contents within the mirror.

Another object of the present invention is to provide a method for producing a cell for an electrochromic mirror, which can overcome the sealing deficiency and suppress the deterioration of the capabilities exhibited by the contents inside the cell, with the durability enhanced.

Furthermore, an object of the present invention is to provide an electrochromic mirror using a cell produced by the above-mentioned methods.

After an extensive research and development made on a method for producing a light weight and highly durable electrochromic mirror cell, it has been found that a sealant can be accurately and uniformly applied in a narrower width by dispensing or screen-printing an epoxy-based sealant containing beads. It has also found that foaming and cracking of a sealant causing the sealing deficiency occur by the degasification of the solvent and lower molecular weight components contained a sealant, happening after the sealant is cured. Particularly, since an electrochromic anti-glare mirror has a sealant applied in a relatively wider width and two substrates disposed, spaced relatively wider, the amount of the sealant is increased, resulted in an increase in the degasification. The present inventors have also found that the above-mentioned sealing deficiency can be prevented by pre-curing a sealant so as to degasifying sufficiently the above-mentioned components before two substrates are superposed on each other.

According to one aspect of the present invention, there is provided a method for producing a cell for an electrochromic mirror, which comprises a step of applying an epoxy-based sealant containing beads on a predetermined position of the surface peripheral edge of at least one of two electrically conductive substrates by dispensing or screen-printing; and a step of superposing the two substrates such that the width of the applied sealant is made 2 mm or less.

According to another aspect of the present invention, there is provided a method for producing a cell for an electrochromic mirror, which comprises a step of applying an epoxy-based sealant on a predetermined position of the surface peripheral edge of at least one of two electrically conductive substrates; a step of pre-curing the sealant before superposing the two substrates; and a step of curing the sealant with the two substrates superposed.

According to further aspect of the present invention, there is provided an electrochromic mirror produced by injecting an electrolyte into a cell obtained by the above methods.

DETAILED DESCRIPTION OF THE INVENTION

A method for producing an electrochromic mirror cell in accordance with the present invention is hereinbelow described in the order of the steps.

At first, an epoxy-based sealant is applied on a predetermined position of the surface peripheral edge of at least one of two electrically conductive substrates.

The description of the electrically conductive substrates are as follows.

The term "electrically conductive substrates" used herein designates ones which act as electrodes. Therefore, the conductive substrate used in the present invention encompasses a substrate which itself is made from an electrically conductivity material, or a laminate formed by laminating an electrode layer on one or both of the surfaces of a non-electrically conductive substrate. Regardless of whether a substrate has electrically conductive or not, it necessarily has a smooth surface at normal temperature but may have a flat or curved surface and may be deformable under stress. The substrates generally have the same shape but may have a different shape as well. Although not restricted, the thickness of the substrate is usually from 0.2 to 2.5 mm.

One of the two conductive substrates is transparent and the other is a reflective conductive substrate which can reflect electromagnetic waves, typically lights.

The term "transparent" used herein denotes an optical transmissivity of 10 to 100% in visible light region. No particular limitations is imposed on the materials for such a transparent substrate. It may thus be a color or colorless glass, a reinforced glass and a resin of color or colorless transparency. Specific examples of such a resin include polyethylene terephthalate, polyamide, polysulfone, polyether sulfone, polyether etherketone, polyphenylene sulfide, polycarbonate, polyimide, polymethyl methacrylate, and polystyrene.

Eligible materials for the transparent electrode layer may be a thin film of metal such as gold, silver, chrome, copper and tungsten or metal oxides such as ITO ($In_2O_3$—$SnO_2$), tin oxide, silver oxide, zinc oxide and vanadium oxide. The electrode layer has a film thickness in the range of usually 10 to 500 nm and preferably 50 to 300 nm. The surface resistance, i.e., resistance per unit area, of the electrode is usually in the range of 0.5 to 500 Ω/sq and preferably 1 to 50 Ω/sq. Any suitable known method for forming the electrode layer on the transparent substrate can be employed.

The reflective electrically conductive substrate may be exemplified by (1) a laminate comprising a non-conductive transparent or opaque substrate and a reflective electrode layer formed thereon, (2) a laminate comprising a non-conductive transparent substrate having a transparent electrode layer on one of its surfaces and a reflective electrode layer on the other surface, (3) a laminate comprising a non-conductive transparent substrate having a reflective layer formed thereon and further a transparent electrode layer formed thereon, (4) a laminate comprising a reflective substrate and a transparent electrode layer formed thereon, and (5) a plate-like substrate which itself functions as a reflective layer and an electrode.

The term "reflective electrode layer" used herein denotes a thin film which has a specular surface and is stable electrochemically. Such a thin film are the films of metal such as gold, platinum, tungsten, tantalum, rhenium, osmium, iridium, silver, nickel and palladium and the film of an alloy such as platinum-palladium, platinum-rhodium and stainless steel. Any suitable method may be used for the formation of the thin film having a specular surface, and thus vacuum deposition, ion-plating or sputtering is suitably selected. A substrate for the reflective conductive layer may or may not be transparent. Therefore, the substrate may he the above-exemplified transparent substrates, and various opaque plastics, glasses, woods, and stones as well. In the case where the above-described reflective electrode layer itself has rigidity, a substrate therefor may be omitted.

The above-mentioned reflective plate and reflective layer are substrates and thin films both of which have a specular surface. The plate and layer may be a plate or a thin film, formed from silver, chrome, aluminum, stainless steel, and nickel-chrome.

The substrate may have an electrochromic compound layer or a layer containing an electrochromic compound formed thereon.

A sealant used in the present invention may be selected from epoxy-based sealants which have been widely used for the production of a liquid crystal display. The sealant may be thermally curing type or photo-curing type cured by the irradiation of ultraviolet or visible light.

Specific examples of such epoxy-based sealants are bisphenol A type epoxy resin, bisphenol F type epoxy resin, biphenyl type epoxy resin, bisphenol S type epoxy resin, diphenylether type epoxy resin, dicyclopentadiene type epoxy resin, bromine-containing bisplienol F type epoxy resin, fluorine-containing bisphenol A type epoxy resin, orthocresolnovolak type epoxy resin, DPP novolak type epoxy resin, trishydroxyphenylmethane type epoxy resin, tetraphenylolethane type epoxy resin, dicylopentadienephenol type epoxy resin, glycidylamine type epoxy resin, glycidyl ester type epoxy resin, alicyclic type epoxy resin, urethane-modified epoxy resin, and silicone-containing epoxy resin.

Specific examples of the thermally-curing sealant are ones cured only with an epoxy resin and ones cured with a curing agent to be added therein. Sealants of which the epoxy resin is cured is mixed with a catalytic curing agent. Specific examples of the catalytic curing agent are benzylsulfonium salt, benzylammonium salt, pyridinium salt, benzylphosphonium salt, hydrazinium salt, carboxylate, sulfonate, and amineimide. Specific examples of the curing agent to be mixed with a sealant are amine-based curing agents such as diethylenetriamine, triethylenetetramine, menthendiamine, isophoronediamine, methaxylenediamine, diaminodiphenylmethane, methaphenylenediaminie, diaminodiphenylsulfone, and polyamideamine; acid anhydride curing agents such as methyltetrahydrophthalate anhydride, methylhexahydrophthalate anhydride, and methylnadic anhydride; and phenolic curing agents such as naphtol phenolic resin, dicyclopentadiene phenolic resin, and styrene phenolic resin. There may be used a latent thermally curing agent such as dicyandiamide, dihydrazide adipicate, imidazolic compounds, and an epoxy-amine adduct.

Specific examples of the photo-curing agent are the above-described epoxy resins, and epoxy-modified acrylic resins obtained by reacting the above-described epoxy resins with acrylic acid, methacrylic acid, crotonoic acid, hexylacrylic acid, or cinnamic acid. The photo-curing catalyst for the epoxy resins may be aryldiazonium salt, diaryliodinium salt, triarylsuironium, β-ketosulfone, iminosulfonate, and benzoylsulfonate. The photo-curing catalyst for the epoxy-modified acrylic resins may be benzylmethylketal, α-hydroxyketone, and α-aminoketone.

The sealant may be mixed with beads. Beads act as spacers to keep the space, i.e., cell gap, between two conductive substrates, constant when they are laminated. The average particle size of such beads are usually from 200 to 20 μm, preferably from 150 to 30 μm, more preferably from 100 to 40 μm, and particularly preferably from 80 to 50 μm. No particular limitation is imposed on the materials for the beads as long as they have insulation properties. Therefore, there may be used (1) a glass such as quarts glass, soda-lime glass, borosilicate glass, and lead glass or (2) a resin such as an acrylic-resin, a poly(propylene carbonate)-resin, and a vinylbenzene-resin. The beads may be colorless or colored and may be transparent or opaque.

When the sealant contains the beads, the content thereof is preferably from 0.01 to 10 percent by mass, more preferably from 0.05 to 5 percent by mass, and particularly preferably from 0.1 to 3 percent by mass. The sealant may contain fillers such as alumina and silica.

In the case where the beads are contained in the epoxy sealant, the viscosity thereof is preferably from 0.5 to 500 Pa.s, more preferably 2 to 300 Pa.s, and particularly preferably 5 to 150 Pa.s.

The sealant is usually applied on a predetermined place of the surface peripheral edge of one of the substrates by dispensing or screen-printing. Needless to mention, the sealant may be applied on the surface peripheral edges of both of the substrates. In the case of using a substrate provided with a conductive layer, the sealant is applied on the surface peripheral edge of the conductive layer. The sealed portion may be provided with at least one opening through which an electrolyte or the like is injected.

In general, two conductive substrates having the same shape are used to produce an electrochromic mirror. In the case where two substrates are fittingly superposed on each other, the sealant is applied on the portion, 0.1 to 10 mm apart, from the edge of the substrate, along the shape thereof. Alternatively, in the case where two substrates are superposed, offsetting from each other in a parallel direction, the position of the sealant to be applied is adjusted depending on the direction or position to be offset.

Dispensing may be operated with a prior known device such as those equipped with discharge nozzles, nozzle-fixed heads, sealant-containing barrels, a discharge adjuster, and a plate for setting substrates. Screen-printing may be operated with a prior known device equipped with a vacuum table, a frame-switching mechanism, a squeegee-switching mechanism, a squeegee-horizontal-shifting mechanism, a screen-printing plate, and a squeegee. Dispensing and screen-printing may be conducted automatically or manually. The former is preferred. Dispensing is preferably operated by a mechanism which can control the movement of a discharging port with a robot movable in X, y directions, i.e. two-way mode or a X, Y, Z directions, i.e., three-way mode, screen-printing is preferably operated by a mechanism which can control the movement of a squeegee.

In order to lighten a mirror, a sealant is applied in such an amount that the sealant width after the two substrates are laminated is 2 mm or less, preferably 1.9 mm or less, and more preferably 1.8 mm or less. No particular limitation is imposed on the lower limit of such a sealant width, which, however, is usually 0.5 mm or more, preferably 0.8 mm or more. The sealant width of 2 mm or less makes it possible to reduce the size of a mirror case, resulting in the weight reduction of a mirror. However, a mirror having such a narrower sealant portion is liable to the deterioration of the durability because the capability of sealing the inner portion of the mirror from the outside is deteriorated. Therefore, in order to maintain enhanced durability, it is necessary to apply a sealant uniformly with high accuracy.

Therefore, a dispensing operation is preferably carried out under the following conditions. That is, the bore of a dispenser discharging nozzle is selected such that beads contained in a sealant can pass therethrough and is usually within the range from 0.10 or more to less than 2 mm, preferably from 0.13 to 1.99 mm, more preferably from 0.19 to 1.45 mm, and particularly preferably from 0.26 to 1.12 mm. Discharging pressure is selected from the range of usually 50 to 700 kPa, preferably 100 to 500 kPa, and more preferably 150 to 400 kPa. The pressure medium may be air, and inactivate gas such as nitrogen and argon. The sweep speed of the nozzle is set to be usually from 0.1 to 500 mm/sec, preferably from 1.0 to 300 mm/sec, and more preferably 5.0 to 200 mm/sec. The space between the nozzle tip and a substrate is set to be usually 2 mm or less, preferably 1.5 mm or less, and 0.05 mm or more.

Screen-printing is preferably carried out under the following conditions. The squeegee angle of a printing machine is set to be usually from 90 to 30°, preferably from 90 to 45°. Squeegee pressure is set to be usually from 0.01 to 0.4 MPa, preferably 0.1 to 0.3 MPa. The sweeping speed of a squeegee is set to be usually from 5 to 500 mm/sec, preferably from 40 to 300 mm/sec. The space between the printing plate and a substrate is set to be usually 5 mm or less, preferably 3 mm or less and 0.01 mm or more, preferably 0.050 mm or more.

A printing plate is provided on the position corresponding to that of a substrate where a sealant is applied, with a meshed portion usually in the form of slits through which a sealant passes. The slit width is preferably from 1 to 2 mm, preferably from 0.2 to 1.5 mm. No particular limitation is imposed on the mesh size as long as beads contained in a sealant can pass, which, however, is usually on the order of from 48 to 470 mesh, preferably from 63 to 320 mesh.

Next, two substrates are laminated by superposing a substrate applied with a sealant on the other substrate, facing each other or facing a conductive surface if a conductive layer is formed, to the substrate. The lamination of two conductive substrates is conducted by superposing one of the substrates on the other substrate to be registered with each other, with a predetermined space or superposing one of the substrates on the other substrate, offsetting from each other, with a predetermined space. This is selected depending on an intended mirror.

The lamination of the substrates is completed by curing the sealant. The sealant is cured under the conditions suitably selected depending on the types of substrate and sealant to be used. For example, the thermally curing sealant is heated at a temperature of usually from 80 to 200° C., preferably from 100 to 180° C. for one minute to 3 hours, preferably 10 minutes to 2 hours. When using the photo-curing sealant, eligible light sources are high voltage mercury lamps, fluorescent lamps and xenon lamps. Although not restricted, the irradiation dose is usually from 100 to 50,000 mJ/cm$^2$, preferably from 1,000 to 20,000 mJ/cm$^2$.

When laminating the substrates, they are arranged in a parallel relationship to one another. Although not restricted, the width of the cell gap is usually from 20 to 200 µm, preferably 30 to 150 µm. The width of the cell gap can be easily adjusted by selecting the particle size of the beads contained in a sealant. Alternatively, any suitable shaped spacer may he placed on the peripheral edge of the substrate in order to adjust the width of the cell gap.

In the present invention, a cell can be produced by applying a sealant on one of the substrates and superposing them in a manner described above. However, in order to produce a mirror with enhanced durability, a sealant applied on a substrate is preferably pre-cured before being superposed on the other substrate. In the case of pre-curing a sealant, the sealant is also preferably applied in such an amount that the sealant width after the substrates are laminated is made 2 mm or less.

The term "pre-cure" used herein denotes a state that the sealant is in the progress of curing, i.e., is not completely cured and fit to the substrate by being squashed when being superposed on the other substrate thereby exhibiting sufficient adhesivity. The term "sufficient adhesivity" used herein denotes adhesivity obtained by adhering a glass to a glass is 1 MPa or more, preferably 5 MPa or more, and more preterably 10 MPa or more. Such a pre-curing operation can remove the degasfying components such as the solvent and low molecular weight components from a sealant and thus can prevent foaming and cracking of the sealed portion caused by gasification occurring when two substrates are laminated. The adhesivity is the value measured in accordance with JIS K 6850.

A sealant is preferably pre-cured by heating. Specific methods for pre-curing are as follows.

(1) Putting a substrate applied with a sealant into an oven (2) Placing a substrate applied with a sealant on a hot plate.

(3) Irradiating a substrate applied with a sealant with a halogen lamp or an infrared or far infrared lamp.

(1) Heating with an oven

In the case of using an oven, there are two methods, one of in which a substrate is put into an oven, the inside of which maintained at a certain temperature and the other of in which a substrate is put into an oven and heated to a certain temperature. Either one of the methods may be suitably employed. The temperature in an oven is usually from 40 to 160° C., preferably from 50 to 130° C., and more preferably from 60 to 100° C. In the case of putting a substrate into an oven maintained at a certain temperature, the time of heating a substrate in an oven is selected suitably, depending on the type of sealant and heating temperature but is usually from 1 to 180 minutes, preferably from 5 to 120 minutes, and more preferably from 10 to 100 minutes. In the case of heating to a certain temperature, the heating rate is usually from 0.5 to 10° C./minute, preferably from 1 to 7° C./minute, and more preferably from 1 to 5° C./minute. In this case, the temperature once reached at a certain level may be then maintained for usually 180 minutes or shorter, preferably 120 minutes or shorter, and more preferably 100 minutes or shorter and one minute or longer.

In either case, a substrate may be removed from the oven immediately after the completion of heating and left to be cooled or cooled in the oven. The cooling rate is usually from 0.5 to 100° C./minute, preferably from 1 to 70° C. minute, and more preferably from 1 to 50° C./minute.

Eligible ovens are conventional dry ovens or ones which circulating hot air. The interior of an oven may be inactivating atmosphere such as nitrogen and argon.

(2) Heating on a hot plate

In the case of using a hot plate, there are two methods, one of in which a substrate is place on a hot plate maintained at a certain temperature and the other of in which a substrate is place on a hot plate and then heated to a certain temperature. Either one of the methods may be suitably employed. The temperature on a hot plate is usually from 40 to 200° C., preferably from 50 to 150° C., and more preferably from 60 to 120° C. In the case of heating a substrate on a hot plate maintained at a certain temperature, the time of heating is usually from 0.5 to 100 minutes, preferably from 1 to 60 minutes, and more preferably 2 to 30 minutes. In the case of heating to a certain temperature, the heating rate is usually from 0.5 to 100° C./minute, preferably 1 to 60° C./minute, and more preferably 1 to 30° C./minute. In this case, the temperature once reached at a certain level may be then maintained for usually 100 minutes or shorter, preferably 60 minutes or shorter, and more preferably 30 minutes or shorter and one minute or longer.

In either case, a substrate may be removed from a hot plate immediately after the completion of heating and left to be cooled or cooled in the oven. The cooling rate is usually from 0.5 to 120° C./minute, preferably from 1 to 70° C./minute, and more preferably from 1 to 50° C./minute.

A hot plate may be placed in an air atmosphere or in a bag of inactivating atmosphere such as nitrogen and argon.

(3) Heating by irradiation using a halogen lump or an infrared or far infrared lump In the case of heating a substrate by irradiation, there are two methods, one of in which a substrate is irradiated by light from a lump which is lighting in a normal state and the other of in which the illuminance of a lump to a substrate is adjusted and then the substrate is heated to a certain temperature. Either one of the methods may be suitably employed. In the case of irradiating with a lump lighting in a normal state, the surface temperature of a substrate is usually from 40 to 160° C., preferably from 50 to 130° C. and more preferably from 60 to 100° C. The irradiation period is usually from 1 to 180 minutes, preferably from 5 to 120 minutes, and more preferably from 10 to 100 minutes. In the case of adjusting the illuminance of a lump and the heating to a certain temperature, the heating rate is usually from 0.5 to 10° C./minute, preferably from 1 to 7° C./minute, and more preferably 1 to 5° C./minute. In this case, the temperature once reached at a certain level may be then maintained for usually 80 minutes or shorter, preferably 120 minutes or shorter, and more preferably 100 minutes or shorter and one minute or longer.

In either case, the lump irradiation may be stopped immediately after the completion of heating or the substrate is gradually cooled by adjusting the lump illuminance. The cooling rate is usually from 0.5 to 100° C./minute, preferably from 1 to 70° C./minute, and more preferably from 1 to 50° C./minute. The irradiation may be conducted under an air atmosphere or an inactivating atmosphere such as nitrogen or argon.

As described above, after pre-curing a sealant, a substrate with the pre-cured sealant is superposed on the other substrate, facing each other or facing an electrically conductive surface, if an electrically conductive layer is formed, to the substrate thereby laminating the two substrate. The lamination of two conductive substrates may be conducted in accordance with the above-described methods varied depending on a mirror to be produced.

Using the above-described methods, a cell for an electrochromic mirror can be produced. The use of a cell produced by the methods of the present invention makes it possible to produce a light-weight electrochromic mirror with enhanced durability.

The followings are explanations as to a method for producing an electrochromic mirror using a cell produced in accordance with the method of the present invention.

Various known methods may be employed for producing an electrochromic mirror. For instance, an electrochromic mirror can be easily produced by injecting a liquid electrolyte or a liquid electrolyte containing an electrochromic compound if necessary, into a cell through an inlet and sealing the inlet, followed by being connected to a power source and a mirror case.

An all solid-state type electrochromic mirror can be easily produced by injecting a solid electrolyte precursor containing a liquid electrolyte and a polymerizable monomer, a solid electrolyte composition precursor further containing an electrochromic compound, a high polymer solid electrolyte precursor, or a high polymer solid electrolyte composition precursor further containing an electrochromic compound into a cell through an inlet and curing it before or after sealing the inlet so as to form an electrolyte, followed by connection to a power source and a mirror case.

The electrolyte may be selected from various known electrolytes which may be liquid, gelatinized and solid. Preferred are solid electrolytes. Eligible liquid electrolytes are ones dissolving a supporting electrolyte such as salts, acids, or alkalis in a solvent. No particular limitation is imposed on the solvent as long as it can dissolve the supporting electrolyte. Preferred are ones having a polarity. Specific examples of the solvent are water, and organic polar solvent such as acetic anhydride, methanol, ethanol, propylene carbonate, ethylene carbonate, dimethylsulfoxide, dimethoxyethane, acetonitrile, γ-butyrolactone, sulforan, 1,3-dioxane, N,N-dimethylformamide, 1,2-dimethoxyethane, and tetrahydroturan. Preferred are propylene carbonate, ethylene carbonate, dimethylsulfoxide, dimethoxyethane, acetonitrile, γ-butyrolactone, sultoran, 1,3-dioxane, N,N-dimethylformamide, 1,2-dimethoxyethane, and tetrahydrofuran. These solvents may be used singlely or in combination.

No particular limitation is imposed on salts used as the supporting electrolyte, which may be inorganic ion salts such as alkali metal salts and alkaline earth metal salts, quaternary ammonium salts, and cyclic quaternary ammonium salts. Specific examples of such salts are alkali metal salts of lithium, sodium or potassium such as $LiClO_4$, LISCN, $LiBF_4$, $LiAsF_6$, $LiCF_3SO_3$, $LiPF_6$, LiI, NaI, NaSCN, $NaClO_4$, $NaBF_4$, $NaAsF_6$, KSCN and KCl; quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$, and mixtures thereof.

No particular limitation is imposed on acids as the supporting electrolyte. Any inorganic acids and organic acids may be used. Specific examples are sulfuric acid, hydrochloric acid, phosphoric acid, sultonic acid, and carboxylic acid.

No particular limitation is imposed on alkalis as the supporting electrolyte as well. Sodium hydroxide, potassium hydroxide, and lithium hydroxide may be used.

Eligible gelatinized electrolytes are ones obtained by adding a polymer or a gelatinizer to the above-mentioned liquid electrolyte to be viscous or gelatinized. Although not restricted, the polymer may be polyacrylonitrile, carboxymethyl cellulose, polyvinyl chloride, polyethylene oxide, polyurethane, polyacrylate, polymethacrylate, polyamide, polyacrylicamide, cellulose, polyester, polypropylene oxide, and nafion. Eligible gelatinizers are oxyethylene methacrylate, oxyethylene acrylate, urethaneacrylate, acrylicamide and agar—agar. The gelatinized electrolyte may be sandwiched between two opposing conductive substrates by injecting a mixture of a monomer, which is a precursor of the polymer, and a precursor of the gelatinizer into a cell formed by laminating two conductive substrates and then polymerizing or gelatinizing the mixture.

No particular limitation is imposed on the solid electrolytes as long as they are solid at room temperature and have ion conductivity. Specific examples of the solid electrolyte are polyethylene oxide, a polymer of oxyethylenemethacrylate, nafion, polystyrene sulfonate. Particularly preferred are polymeric solid electrolyte obtained by polymerizing a precursor containing an oxyalkylene(metha)acrylate-based compound or a urethane acrylate-based compound as a main component. The solid electrolyte may be ones obtained by solidifying a precursor which is a compound containing a monofunctional acryloyl-modified polyalkylene oxide and/or a polyfunctional acryloyl-modified polyalkylene oxide, the above-mentioned organic solvent, and the above-mentioned supporting electrolyte.

No particular limitation is thus imposed on the electrochromic compound as long as it colors, decolors, and discolors by electrochemical oxidation or reduction reaction. Specific examples of the electrochromic compound are $Mo_2O_3$, $Ir_2O$, NiO, $V_2O_5$, $WO_3$, viologen, polytionphene, polyaniline, polypyrrole, metal phthalocyanine, pyrazoline, phenylenediamine, phenazine, phenoxazine, phenothiazine, tetrathiafulvalene, ferrocene, and derivatives thereof.

Examples of the invention will now be provided, with understanding that the invention is in no way limited by these examples.

EXAMPLE 1

A sealant was prepared by adding 0.4 g of blue plate glass beads having an average particle size of 53 to 63 μm to 20 g of a commercially available thermally-curing epoxy-based sealant (STRACTOBOND XN-21-S) and well-kneading them. The viscosity of the resulting sealant was 40 Pa.s. The sealant was transferred to a 30 ml barrel for a dispenser and defoamed in a conventional manner. A discharging needle of 19 G (0.70 mm) bore and 13 mm length was attached to the barrel and then set on a X, Y, Z 3-way mode controlling auto-dispenser.

Onto the work base of the auto-diespenser was fixed a reflective electrically conductive substrate made of blue plate and having a thickness of 1.1 mm and a rectangular shape with 4 rounded corners. The sealant was applied along the peripheral edge of the substrate at a nozzle sweeping speed of 50 mm/sec and a discharging pressure of 0.2 MPa, with the discharging port and the substrate spaced 0.5 mm apart.

The reflective conductive substrate applied with the sealant was superposed on and registered with a transparent conductive substrate and heated at a temperature of 160° C. for 90 minutes so as to cure the sealant thereby laminating the two substrates. The sealant width of the resulting cell for an electrochromic anti-glare mirror was 1.7 to 2.0 mm.

EXAMPLE 2

A sealant was prepared by adding 2.0 g of acrylic resin beads having an average particle size of 63 to 75 μm to 100 g of a commercially available thermally-curing epoxy-based sealant (STRACTOBOND XN-21-S) and well-kneading them. The viscosity of the resulting sealant was 40 Pa.s. The sealant was placed on the 180-meshed portion of a screen printing plate. The sealant was applied along the peripheral edge of a conductive substrate made of blue plate and having a thickness of 1.1 mm and a rectangular shape with 4 rounded corners by screen-printing at a squeegee sweeping speed of 10 mm/sec, a squeegee pressure of 0.2 MPa, and a squeegee angle of 85° with the printing plate and the substrate spaced 1.3 mm apart.

The conductive substrate applied with the sealant was superposed on and registered with another conductive substrate and heated at a temperature of 160° C. for 90 minutes so as to cure the sealant thereby laminating the two substrates. The sealant width of the resulting cell for an electrochromic anti-glare mirror was 1.6 to 1.8 mm.

EXAMPLE 3

An electrochromic mirror cell with an inlet through which an electrolyte precursor is injected was produced by following the procedures of Example 1.

On the other hand, a homogeneous solution of a polymeric solid electrolyte composition precursor containing an electrochroinic compound was prepared by adding lithium perchlorate, diheptylviologen perchlorate and ferrocene to a mixed solution of 1.0 g of methoxypolyethylene glycol monomethacrylate manufactured by SHIN-NAKAMURA CHEMICAL CO., LTD. under the trade name of "M40GN", 0.02 g of polyethylene glycol dimethacrylate manufactured by SHIN-NAKAMURA CHEMICAL CO., LTD. under the trade name of "9G", 4.0 g of γ-butylolactone, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid such that the concentration of each lithium perchlorate, diheptylviologen perchlorate and ferrocene is made 0.8 M, 30 mM, and 30 mM, respectively. The resulting solution was injected into the above cell through the inlet, followed by sealing the inlet. The polymeric solid electrolyte composition precursor was photo-cured. The cell was then connected to lead wires and a control circuit and accommodated into a mirror case thereby obtaining an electrochromic anti-glare mirror.

The resulting mirror was lighter than conventional ones with the equivalent size because the size of the mirror case was smaller.

EXAMPLE 4

A sealant was prepared by adding 0.4 g of blue plate glass beads having an average particle size of 53 to 63 g m to 20 g of a commercially available thermally-curing epoxy-based sealant (STRACTOBOND XN-21-S) and well-kneading them. The viscosity of the resulting sealant was 40 Pa.s. The sealant was transferred to a 30 ml barrel for a dispenser and defoamed in a conventional manner. A discharging needle of 19 G (0.70 mm) bore and 13 mm length was attached to the barrel and then set on a X, Y, Z 3-way mode controlling auto-dispenser.

On the work base of the auto-dispenser was fixed a transparent electrically conductive glass substrate with an ITO layer. The sealant was applied along the peripheral edge of the substrate at a nozzle sweeping speed of 50 mm/sec and a discharging pressure of 0.2 MPa, with the discharging port and the substrate spaced 0.5 mm apart.

The substrate applied with the sealant was placed in a hot-air circulation type oven the temperature of which inside is held at 80° C. and heated for 45 minutes. Thereafter, the substrate was removed from the open and left to be cooled. The sealant was in progress of curing and was in a state that it is deformable by applying locally a pressure.

Onto the substrate with the pre-cured sealant was placed a reflective conductive substrate while applying a slight pressure thereto. The sealant was then squashed and deformed. The resulting cell was heated at 160° C. for 2 hours so as to cure completely the sealant. The sealant was not deformed even by applying a local pressure. The substrates was firmly adhered to each other.

The electrochromic anti-glare cell thus obtained was free from the foaming or bubbling and cracking of the sealant.

EXAMPLE 5

The sealant of Example 4 was applied on a substrate by following the procedures of Example 4. The substrate applied with the sealant was placed on a hot plate held at 75° C. After 10 minutes passed, the substrate was removed from the hot plate and left to be cooled. The sealant was in progress of curing and was in a state that it is deformable by applying locally a pressure.

Onto the substrate applied with the pre-cured sealant was placed a reflective conductive substrate while applying a slight pressure thereto. The sealant was then squashed and deformed. The resulting cell was heated at 180° C. for 1 hour so as to cure the sealant. The sealant was not deformed even by applying a local pressure. The substrates was firmly adhered to each other.

The electrochromic anti-glare cell thus obtained was free from the foaming or bubbling and cracking in the sealed portion.

EXAMPLE 6

A sealant was prepared by adding 2.0 g of acrylic resin beads having an average particle size of 63 to 75 µm to 100 g of a commercially available thermally-curing epoxy-based sealant (STRACTOBOND XN-21-S) and well-kneading them. The viscosity of the resulting sealant was 40 Pa.s. The sealant was placed on the 180-meshed portion of a screen printing plate. The sealant was applied along the peripheral edge of a conductive substrate made of blue plate and having a thickness of 1.1 mm and a rectangular shape with 4 rounded corners by screen-printing at a squeegee sweeping speed of 10 mm/sec, a squeegee pressure of 0.2 MPa, and a squeegee angle of 85° with the printing plate and the substrate spaced 1.3 mm apart.

The substrate was placed under a halogen lump and then it was lighted. After 5 minutes passed, the surface temperature of the substrate reached at 95° C. Thereafter, the lump irradiation was continued at 95° C. for 20 minutes and the lump was turned off. The substrate was left to be cooled down. The sealant was in progress of curing and deformable by applying a local pressure.

Onto the substrate applied with the pre-cured sealant was placed a reflective conductive substrate while applying a slight pressure thereto. The sealant was then squashed and deformed. The resulting cell was heated at 160° C. for 1.5 hour so as to cure the sealant. The sealant was not deformed even by applying a local pressure. The substrates was firmly adhered to each other.

The electrochromic anti-glare cell thus obtained was free from the foaming or bubbling and cracking of the sealant.

EXAMPLE 7

An electrochromic mirror cell with an inlet through which an electrolyte precursor is injected was produced by following the procedures of Example 4.

On the other hand, a homogeneous solution of a polymeric solid electrolyte composition precursor containing an electrochromic compound was prepared by adding lithium perchlorate, diheptylviologen perchlorate and ferrocene to a mixed solution of 1.0 g of methoxypolyethylene glycol monomethacrylate manufactured by SHIN-NAKAMURA CHEMICAL CO., LTD. under the trade name of "M40GN", 0.02 g of polyethylene glycol dimethacrylate manufactured by SHIN-NAKAMURA CHEMICAL CO., LTD. under the trade name of "9G", 4.0 g of γ-butylolactone, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid such that the concentration of each lithium perchlorate, diheptylviologen perchlorate and ferrocene is made 0.8 M, 30 mM, and 30 mM, respectively. The resulting solution was injected into the above cell through the inlet, followed by sealing the inlet. The polymeric solid electrolyte composition precursor was photo-cured. The cell was then connected to lead wires and a control circuit and accommodated into a mirror case thereby obtaining an electrochromic anti-glare mirror.

The resulting mirror was left at a temperature of 80° C. for 1,000 hours and then at a temperature of −30° C. for 70 hours. No changes was observed at the sealed portion. The mirror did not change in its initial performances.

By the method of the present invention a sealant can be applied more accurately and uniformly on a substrate in a narrower width, compared with conventional methods. As a result of this, the size of a mirror case can be decreased. Therefore, a lighter mirror case can be produced without deteriorating durability. In the case of introducing a pre-cure step in the method of the present invention, foaming or bubbling and cracking of the sealed portion can be prevented thereby overcoming sealing deficiency and thus suppressing the deterioration of the performances exhibited the contents within a mirror. As a result, there can be produced an electrochromic mirror which is enhanced durability, i.e., long lasting, with high performances.

What is claimed is:

1. A method for producing a cell for an electrochromic mirror which comprises a step of applying an epoxy-based sealant containing beads by dispensing on a predetermined position of a surface peripheral edge of at least one of two electrically conductive substrates; wherein said dispensing is effected with a discharging nozzle bore having a size within the rang from 0.1 to less than 2 mm at a discharging pressure of from 50 to 700 kPa and a nozzle sweeping speed of from 0.1 to 500 mm/sec, and wherein a space between the at least one substrate and a nozzle tip is 2 mm or less; and a step of superposing said two substrates such that a width of the applied sealant is made 2 mm or less.

2. The method according to claim 1 wherein said beads-containing epoxy-based sealant has a viscosity of from 0.5 to 500 Pa.s.

3. The method according to claim 1 wherein said beads-containing epoxy-based sealant has a viscosity of from 5 to 150 Pa.s.

4. The method according to claim 1 wherein said epoxy-based sealant is of a thermally curing type.

5. The method according to claim 1 wherein said beads have an average particle size of from 20 to 200 μm.

6. The method according to claim 1 wherein said beads have an average particle size of from 40 to 100 μm.

7. The method according to claim 1 wherein said beads are formed from a material with insulating properties selected from the group consisting of glass, an acrylic resin, a poly (propylene carbonate) resin, and a vinylbenzene resin.

8. The method according to claim 1 wherein said sealant contains said beads in an amount of from 0.01 to 10 percent by mass.

9. An electrochromic mirror which is obtained by inserting an electrolyte into a cell produced by the method defined in claim 1.

10. A method for producing a cell for an electrochromic mirror which comprises a step of applying an epoxy-based sealant containing beads on a predetermined position of a surface peripheral edge of at least one of two electrically conductive substrates; wherein said applying is effected with a discharging nozzle bore having a size within the range from 0.1 to less than 2 mm at a discharging pressure of from 50 to 700 kPa and a nozzle sweeping speed of from 0.1 to 50 mm/sec, and wherein a space between the at least one substrate and a nozzle tip is 2 mm or less; a step of pre-curing said applied sealant before said two substrates are superposed; an curing said sealant with said two substrates superposed, wherein said beads are formed from a material with insulating properties selected from the group consisting of glass, acrylic resin, poly (propylene carbonate) resin, and vinylbenzene resin.

11. The method according to claim 10 wherein said sealant is pre-cured by heating in an oven maintained at a temperature from 40 to 160° C.

12. The method according to claim 10 wherein said sealant is pre-cured by heating at a temperature of 40 to 200° C. on a hot plate.

13. The method according to claim 10 wherein said sealant is pre-cured by irradiation with a means selected from the group consisting of a halogen lamp, an infrared lamp and a far infrared lamp, such that the surface temperature of said substrate is made from 40 to 200° C.

14. The method according to claim 10 wherein said epoxy-based sealant is of a thermally curing type.

15. The method according to claim 10 wherein said beads have an average particle size of from 20 to 200 μm.

16. The method according to claim 10 wherein said beads have an average particle size of from 40 to 100 μm.

17. The method according to claim 10 wherein said epoxy-based sealant contains beads in an amount of from 0.01 to 10 percent by mass.

18. An electrochromic mirror which is obtained by inserting an electrolyte into a cell produced by the method defined in claim 10.

19. A method for producing a cell for an electrochromic mirror which comprises a step of applying an epoxy-based sealant containing beads by screen-printing on a predetermined position of a surface peripheral edge of at least one of two electrically conductive substrates; wherein said dispensing is effected with a discharging nozzle bore having a size within the range from 0.1 to less than 2 mm at a discharging pressure of from 50 to 700 kPa and a nozzle sweeping speed of from 0.1 to 500 mm/sec, and wherein a space between the at least one substrate and a nozzle tip is 2 mm or less; and a step of superposing said two substrates such that a width of the applied sealant is made 2 mm or less.

20. The method according to claim 19, wherein said screen-printing is performed using a printing machine having a squeegee angle of from 90 to 30°, a squeegee pressure from 0.01 to 0.4 MPa, and a sweeping speed of from 5 to 500 mm/sec, and wherein a space between the at least one substrate and a printing plate is 5 mm or less.

* * * * *